United States Patent [19]
Ohmori

[11] Patent Number: 5,347,522
[45] Date of Patent: Sep. 13, 1994

[54] METHOD AND APPARATUS FOR DETECTING PSEUDO NOISE PATTERN FOR REMOTE LOOPBACK TEST

[75] Inventor: Hisakazu Ohmori, Tokyo, Japan

[73] Assignee: Fujitsu Limited, Kawasaki, Japan

[21] Appl. No.: 730,262

[22] Filed: Jul. 12, 1991

[30] Foreign Application Priority Data

Jul. 13, 1990 [JP] Japan .................. 2-185886

[51] Int. Cl.$^5$ .......................................... G06F 11/08
[52] U.S. Cl. ............................ 371/20.5; 371/20.4; 371/20.6; 371/24; 371/25.1
[58] Field of Search .................. 371/20.5, 20.4, 20.6, 371/24, 25.1

[56] References Cited

U.S. PATENT DOCUMENTS

| | | | |
|---|---|---|---|
| 4,428,076 | 1/1984 | Schuon | 371/20.4 |
| 5,072,448 | 12/1991 | Atwell et al. | 371/20.5 |
| 5,138,608 | 8/1992 | Kucera et al. | 371/20.4 |
| 5,228,042 | 7/1993 | Gauthier et al. | 371/20.5 |

Primary Examiner—Jack B. Harvey
Assistant Examiner—Kyle J. Choi

[57] ABSTRACT

A method for detecting a PN (Pseudo Noise) pattern for a remote loopback test in a communication system includes the following first through fifth steps. The first step receives a first n-bit pattern (n is an arbitrary number) which is a part of the PN pattern. The second step leftwardly shifts n bits of the first n-bit pattern by a first number of bits, so that a second n-bit pattern is generated. The third step executes an exclusive-OR operation on the n bits of the first n-bit pattern and n bits of the second n-bit pattern, so that a third n-bit pattern is generated. The fourth step rightwardly shifts n bits of the third n-bit pattern by a second number of bits, so that a fourth n-bit pattern is generated. The fifth step executes an exclusive-OR operation on the n bits of the third n-bit patterns and n bits of the fourth n-bit patterns, so that a fifth n-bit pattern is generated. The fifth n-bit pattern is a sixth n-bit pattern which is received after the first n-bit pattern. The first through fifth are repeatedly carried out each time n bits of the first n-bit pattern are received at the first step until a pattern detection signal is generated to activate the loopback test procedure when the fifth n-bit pattern and the sixth n-bit pattern become identical for a number of times.

12 Claims, 16 Drawing Sheets

```
(A)  7-BIT PATTERNS CONTAINED IN 2^7 PN PATTERN

---0000111 0111100 10110010---

(B)  RECEIVED 7 BITS

0000111

(C)  OPERATION

1 : RECEIVED 7 BITS                        0000111   ---  (a)
     2 : LEFTWARDLY SHIFT (a) BY 3 BITS         0111000   ---  (b)
     3 : EXOR OPERATION ON (a) AND (b)          0111111   ---  (c)
     4 : RIGHTWARDLY SHIFT (c) BY 4 BITS        0000011   ---  (d)
     5 : EXOR OPERATION ON (c) AND (d)          0111100   ---  (e)
```

FIG. IA PRIOR ART
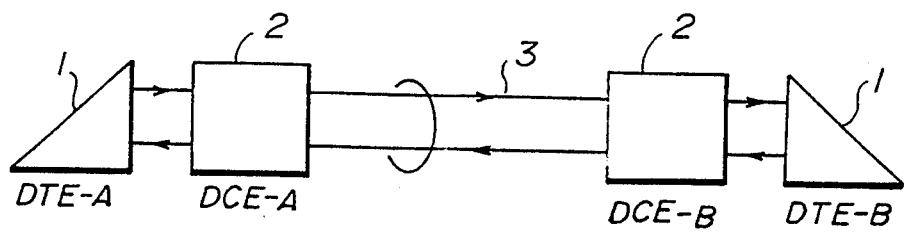
FIG. IB PRIOR ART
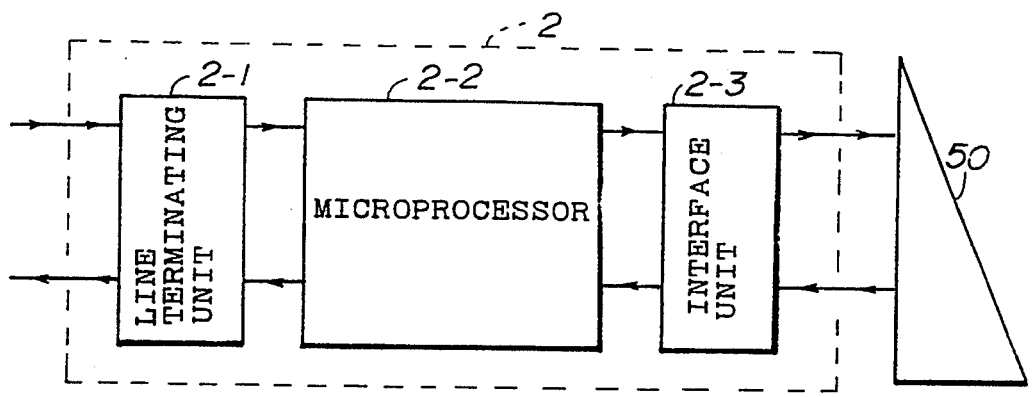
FIG. IC PRIOR ART
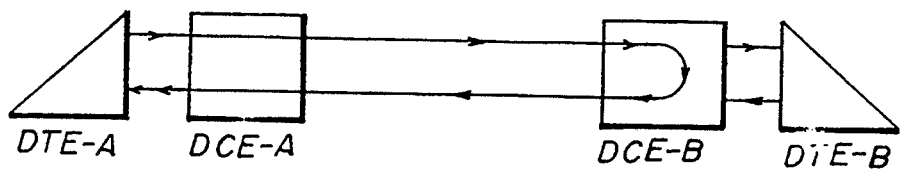

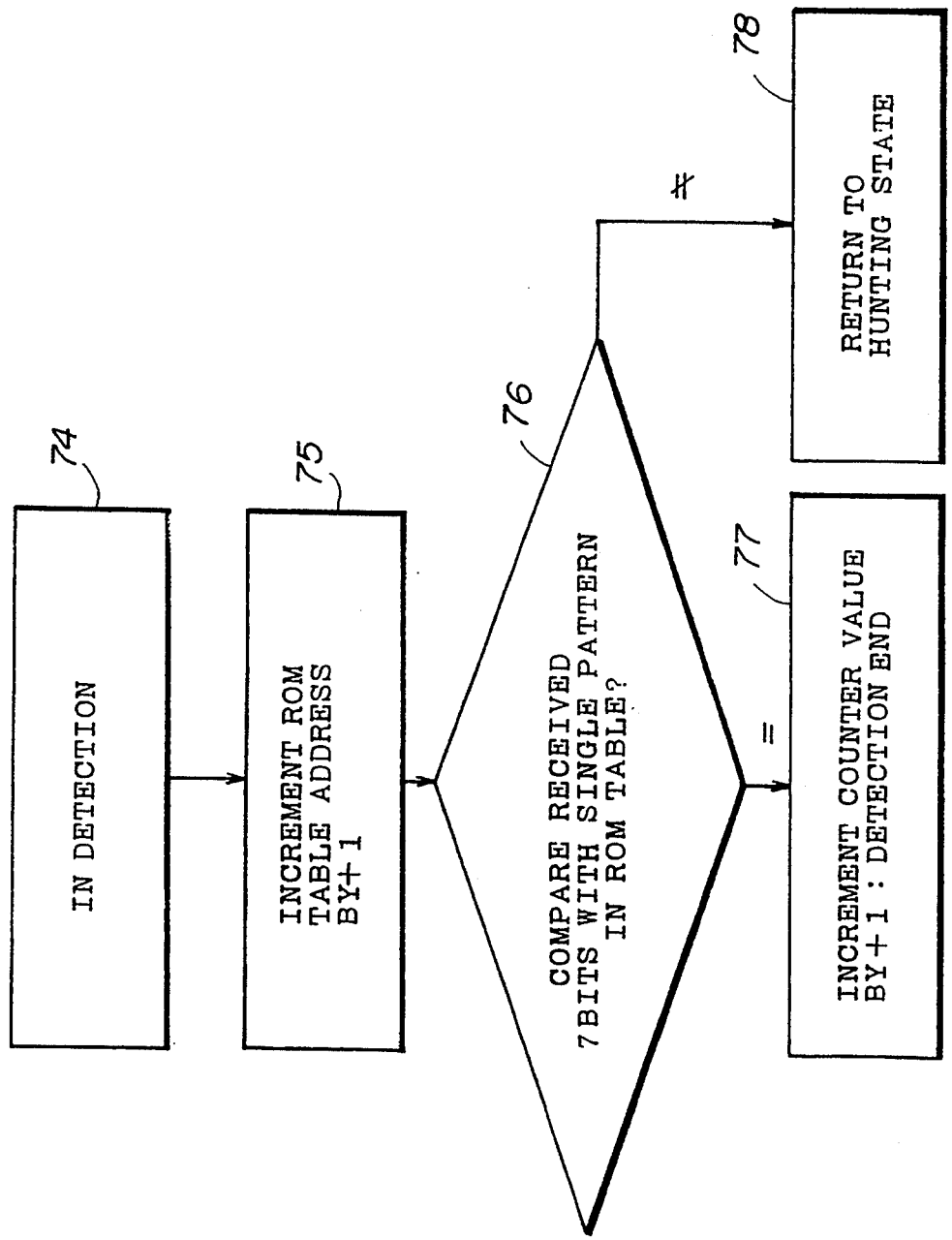

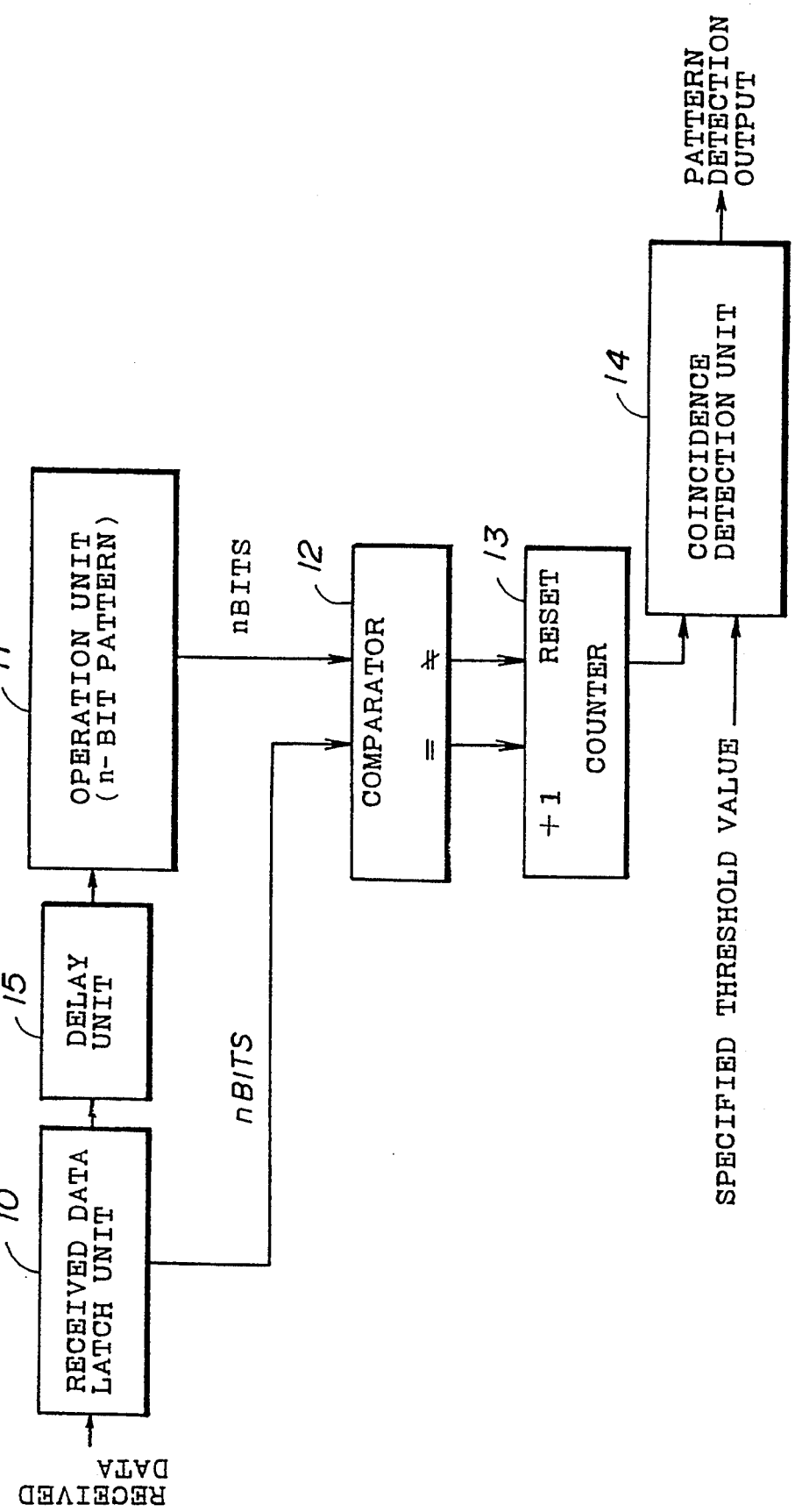

FIG.7

(A) 7-BIT PATTERNS CONTAINED IN $2^7$ PN PATTERN

---0000111 0111100 1011001 0---

(B) RECEIVED 7 BITS

0000111

(C) OPERATION

1 : RECEIVED 7 BITS                                 0000111 --- (a)

2 : LEFTWARDLY SHIFT (a) BY 3 BITS     0111000 --- (b)

3 : EXOR OPERATION ON (a) AND (b)     0111111 --- (c)

4 : RIGHTWARDLY SHIFT (c) BY 4 BITS   0000011 --- (d)

5 : EXOR OPERATION ON (c) AND (d)     0111100 --- (e)

| 1:1 | 2:1 | 3:1 | 4:1 | 5:1 | 6:1 | 7:1 | 8:0 | 9:0 | 10:0 | 11:0 | 12:1 | 13:1 | 14:1 | 15:0 |
| 16:1 | 17:1 | 18:1 | 19:1 | 20:0 | 21:0 | 22:1 | 23:0 | 24:1 | 25:1 | 26:0 | 27:0 | 28:1 | 29:0 | 30:0 |
| 121:0 | 122:1 | 123:1 | 124:1 | 125:0 | 126:0 | 127:0 | 128:1 | 129:1 | 130:1 | 131:1 | 132:1 | 133:1 | 134:1 | 135:0 |
| 136:0 | 137:0 | 138:0 | 139:1 | 140:1 | 141:1 | 142:0 | | | | | | | | |

| | | | | | | | | | | | | | | |
|---|---|---|---|---|---|---|---|---|---|---|---|---|---|---|
| 1:1 | 2:1 | 3:1 | 4:1 | 5:1 | 6:1 | 7:1 | 8:1 | 9:1 | 10:0 | 11:0 | 12:0 | 13:0 | 14:0 | 15:1 |
| 16:1 | 17:1 | 18:1 | 19:0 | 20:1 | 21:1 | 22:1 | 23:1 | 24:1 | 25:0 | 26:0 | 27:0 | 28:1 | 29:0 | 30:1 |
| 181:0 | 182:1 | 183:0 | 184:0 | 185:0 | 186:1 | 187:0 | 188:1 | 189:1 | 190:1 | 191:0 | 192:0 | 193:1 | 194:0 | 195:0 |
| 196:0 | 197:1 | 198:0 | 199:1 | 200:0 | 201:0 | 202:0 | 203:0 | 204:1 | 205:0 | 206:1 | 207:0 | 208:1 | 209:1 | 210:0 |
| 511:0 | 512:1 | 513:1 | 514:1 | 515:1 | 516:1 | 517:1 | 518:1 | 519:1 | 520:1 | 521:0 | 522:0 | 523:0 | 524:0 | 525:0 |
| 526:1 | 527:1 | 528:1 | 529:1 | | | | | | | | | | | |

FIG.11

(A) 9-BIT PATTERNS CONTAINED IN $2^9$ PN PATTERN

--- 101110010 001010000 101011010 ---

(B) RECEIVED 9 BITS

101110010

(C) OPERATION

1 : RECEIVED 9 BITS      101110010 --- (a)

2 : LEFTWARDLY SHIFT (a) BY 4 BITS      100100000 --- (b)

3 : EXOR OPERATION ON (a) AND (b)      001010010 --- (c)

4 : RIGHTWARDLY SHIFT (c) BY 5 BITS      000000010 --- (d)

5 : EXOR OPERATION ON (c) AND (d)      001010000 --- (e)

(A) 11-BIT PATTERNS CONTAINED IN $2^{11}$ PN PATTERN

--- 110110110O1  1011O111111  O11O1OOOO1O ---

(B) RECEIVED 11 BITS

11O11O11OO1

(C) OPERATION

1 : RECEIVED 11 BITS            11O11O11OO1 --- (a)

2 : LEFTWARDLY SHIFT (a) BY 2 BITS    O11O11OO1OO --- (b)

3 : EXOR OPERATION ON (a) AND (b)    1O11O111101 --- (c)

4 : RIGHTWARDLY SHIFT (c) BY 9 BITS    OOOOOOOO1O --- (d)

5 : EXOR OPERATION ON (c) AND (d)    1O11O111111 --- (e)

METHOD AND APPARATUS FOR DETECTING PSEUDO NOISE PATTERN FOR REMOTE LOOPBACK TEST

BACKGROUND OF THE INVENTION (1) Field of the Invention

The present invention generally relates to a method and apparatus for detecting a pseudo noise pattern for a remote loopback test, and more particularly to a method and apparatus for detecting a pseudo noise pattern used for a remote loopback test in which a data circuit-terminating equipment connected to one end of a data transmission line activates another circuit-terminating equipment coupled to the other end thereof.

(2) Description of the Prior Art

A data terminal equipment for use in data communication is coupled to a data transmission line via a data circuit-terminating equipment. When two data terminal equipments located on both sides of the transmission line communicate with each other, data is transferred between the data circuit-terminating equipments provided for the respective data terminal equipments.

In order to test and maintain such data circuit-terminating equipments, a remote loopback test has been recommended by the CCITT Recommendation V.54, the disclosure of which is hereby incorporated by reference. In the recommended remote loopback test, one of the two data circuit-terminating equipments opposite to each other via a data transmission line (normally including an exchange) instructs the other data circuit-terminating equipment to start the remote loopback test. In the above remote loopback test, it is desired that a particular pattern (pseudo noise pattern) be efficiently detected by each of the activated data circuit-terminating equipments located on both sides of the data transmission line.

FIG. 1A shows a data communication system in which the recommended remote loopback test is used, FIG. 1B shows a data circuit-terminating equipment, and FIG. 1C shows how the recommended remote loopback test is activated and carried out. The data communication system shown in FIG. 1A is composed of data terminal equipments (DTE-A and DTE-B) 1, two data circuit-terminating equipments (DCE-A and DCE-B) 2, and a data transmission line 3 composed of a transmit line and a receive line. The data circuit-terminating equipments DTE-A and DTE-B are located on both sides of the data communication line 3, and are coupled with each other. The data circuit-terminating equipments DTE-A and DTE-B simultaneously send and receive data in the two directions at a bit rate equal to, for example, 64K bps (bit per second). Data transmitted via the data transmission line 3 is, for example, an AMI (Alternate Mark Inversion) code, which is a bipolar code. By using the AMI code, it is possible to transmit data at a higher speed than that obtained with a modem (modulator/demodulator) used.

In the past time, the data circuit-terminating equipment 2 was formed of a specific hardware configuration or an (Large Scale Integrated circuit). However, recently, the data circuit-terminating equipment 2 has been configured, as shown in FIG. 1B. The data circuit-terminating equipment 2 shown in FIG. 1B is composed of a data circuit-terminating block 2-1, a microprocessor 2-2, and a data terminal interface block 2-3 connected to terminal 50. It is possible to meet various requirements for the data circuit-terminating equipment 2 by changing firmware formed in the microprocessor 2-2. The functions in common to the various requirements are implemented by hardware or LSIs which form the data circuit-terminating block 2-1 and the data terminal interface block 2-3.

The remote loopback test is carried out in such a case where new data terminal equipment and data circuit-terminating equipment are installed or a fault such as data error occurs. Referring to FIG. 1C, when the data terminal equipment DTE-A receives an instruction to execute the remote loopback test, the data circuit-terminating equipment DCE-A sends a signal showing the activation of the remote loopback test to the data circuit-terminating equipment DCE-B via the data transmission line.

The procedure on the remote loopback test is recommended by the CCITT Recommendation V.54. The recommended procedure will be described below. At the first step of the remote loopback test procedure, the data circuit-terminating equipment DCE-A sends 16 127-bit PN (Pseudo Noise) patterns to the data transmission line. The 127-bit PN pattern (also referred to as a $2^7$ PN pattern) is obtained by scrambling binary zeros (0) by a generating polynomial $1+X^{-4}+X^{-7}$ (X is a variable), and has 127 bits within one period. The 16 127-bit patterns (16 periods) function as a loopback activating signal. The bit rate at which the PN pattern is sent is set to a normal bit rate of the data circuit-terminating equipment DCE-A. The criterion for detecting the PN pattern by the other data circuit-terminating equipment DCE-B is not specified.

At the second step of the remote loopback test procedure, when the data circuit-terminating equipment DCE-B detects the PN pattern, it sends to the data transmission line 16 127-bit PN patterns (2048 bits), each being generated by scrambling binary ones (1) by the generating polynomial $1+X^{-4}+X^{-7}$. The bit rate at which the PN pattern is sent is set to a normal bit rate of the data circuit-terminating equipment DCE-B. The criterion for detecting the PN pattern by the other data circuit-terminating equipment DCE-A is not specified. The 16 127-bit PN patterns function as a confirmation signal. After sending the confirmation signal to the data transmission line, the data circuit-terminating equipment DCE-B forms a loopback path. The data circuit-terminating equipment DCE-A detects the confirmation signal, and enters into a test state (mode) after a time amounting to 2048 bits has elapsed.

At the third step of the remote loopback test procedure, the data circuit-terminating equipment DCE-A sends to the data transmission line 64 127-bit PN patterns (64 periods), each being obtained by scrambling binary ones by the generating polynomial $1+X^{-4}+X^{-7}$. Subsequently, the data circuit-terminating equipment DCE-A sends 64 consecutive binary ones to the data transmission line. The 64 127-bit PN patterns and 64 consecutive binary ones form a completion signal.

It can be seen from the above description that it is necessary to provide each of the data circuit-terminating equipments DCE-A and DCE-B with a means for detecting the 127-bit PN pattern. Conventionally, the detection of the loopback activating signal, the confirmation signal or the completion signal uses firmware which has a program in which a ROM table having all 127-bit PN patterns generated by the generating polynomial $1+X^{-4}+X^{-7}$ is formed. Each 127-bit PN pattern is compared with the PN patterns in the ROM table. Theoretically, there are no identical 7-bit patterns in the 127-bit PN pattern. Thus, it is possible to detect the PN pattern by comparing seven consecutive bits received with seven consecutive bits at a position in the 127 bits in the ROM table.

However, data is received in serial form without having frame information (provided for use in synchronization), and thus there is a possibility that the seven received bits are not the same as the seven bits read out from the ROM table.

Taking into account such a possibility, a procedure shown FIG. 2 is carried out when the PN pattern detection is started. The seven consecutive bits received are compared with six different patterns, in which there is a one-bit phase difference between the adjacent patterns. Each time seven consecutive bits are received, the comparing procedure shown in FIG. 2 is carried out in accordance with flowcharts shown in FIGS. 3A and 3B. The flowcharts shown in FIGS. 3A and 3B, which are executed by the microprocessor 2-2 shown in FIG. 1B, are a procedure executed at the beginning of the PN pattern detection and an in-detection procedure executed after the procedure shown in FIG. 3A, respectively.

At step 70 where the data circuit-terminating equipment 2 is in a loopback activating signal hunting state, the microprocessor 2-2 receives seven consecutive bits via the data line terminating block 2-1. At subsequent step 71, the microprocessor 2-2 compares the seven consecutive bits received with six patterns as shown in FIG. 2. When it is determined, at step 71, that the seven consecutive pattern is the same as one of the six patterns, the microprocessor 2-2 switches to an in-detection state at step 72. On the other hand, when the seven consecutive bits are not the same as any of the six patterns, the data circuit-terminating equipment 2 returns to the hunting state 70 at step 73.

During the in-detection state at step 74 subsequent to step 72, the microprocessor 2-2 increments the address of the ROM table by +1, so that an updated address of the ROM table indicating the next seven-bit pattern at step 75. At step 76, the microprocessor 2-2 compares the next seven consecutive bits received with the seven-bit pattern indicated by the updated address. When it is determined, at step 76, that the both the 7-bit patterns are the same as each other, the value in a register which stores the number of times that the pattern coincidence is detected is incremented by +1 at step 77. When the value in the register becomes equal to a predetermined value (which corresponds to the number of bits defined by the CCITT Recommendation V.54), the detection procedure ends. On the other hand, when it is determined, at step 76, that both the seven-bit patterns are not the same as each other, the microprocessor 2-2 returns to the hunting state 70 at step 78. At the same time, the above-mentioned register is reset.

However, the above-mentioned prior art has the following disadvantages. First, it is necessary to use two different firmware structures which respectively correspond to the procedures shown in FIGS. 3A and 3B. This needs a large amount of complex software. Second, during the procedure shown in FIG. 3A, the microprocessor 2-2 on the receive side waits for the received seven bits which are the same as the seven bits at a certain position of the 127-bit pattern. Thus, in the worst case, the seven bits are hunted and the PN pattern detection procedure shown in FIG. 3B starts after the data circuit-terminating equipment on the transmitter side has sent 127 consecutive bits (one period). Thus, it takes a long time to start the detection procedure shown in FIG. 3B.

SUMMARY OF THE INVENTION

It is a general object of the present invention to provide an improved method and apparatus for detecting a PN pattern for the remote loopback test, in which the above-mentioned disadvantages are eliminated.

A more specific object of the present invention is to provide a method and apparatus capable of rapidly detecting the PN pattern without the above-mentioned ROM table by means of a simple single structure even if the PN pattern is sent out starting from an arbitrary part thereof.

The above-mentioned objects of the present invention are achieved by a method for detecting a PN (Pseudo Noise) pattern for a remote loopback test in a communication system, the method comprising the steps of: (a) receiving a first n-bit pattern (n is an arbitrary number) which is a part of the PN pattern; (b) leftwardly shifting n bits of the first n-bit pattern by a first number of bits, so that a second n-bit pattern is generated; (c) executing an exclusive-OR operation on the n bits of the first n-bit pattern and n bits of the second n-bit pattern, so that a third n-bit pattern is generated; (d) rightwardly shifting n bits of the third n-bit pattern by a second number of bits, so that a fourth n-bit pattern is generated; and (e) executing an exclusive-OR operation on the n bits of the third n-bit patterns and n bits of the fourth n-bit patterns, so that a fifth n-bit pattern is generated. The fifth n-bit pattern shows a sixth n-bit pattern which should be received after the first n-bit pattern, and the step (b) through (e) are repeatedly carried out each time n bits of the first n-bit pattern are received at step (a).

The above-mentioned objects of the present invention are also achieved by an apparatus for detecting a PN (Pseudo Noise) pattern for a remote loopback test in a communication system, the apparatus comprising: first means for receiving a first n-bit pattern (n is an arbitrary number) which is a part of the PN pattern; second means for leftwardly shifting n bits of the first n-bit pattern by a first number of bits, so that a second n-bit pattern is generated; third means for executing an exclusive-OR operation on the n bits of the first n-bit pattern and n bits of the second n-bit pattern, so that a third n-bit pattern is generated; fourth means for rightwardly shifting n bits of the third n-bit pattern by a second number of bits, so that a fourth n-bit pattern is generated; and fifth means for executing an exclusive-OR operation on the n bits of the third n-bit patterns and n bits of the fourth n-bit patterns, so that a fifth n-bit pattern is generated, wherein the fifth n-bit pattern shows a sixth n-bit pattern which should be received after the first n-bit pattern, and the second through fifth means carry out respective operations each time n bits of the first n-bit pattern are received by the first means.

BRIEF DESCRIPTION OF THE DRAWINGS

Other objects, features and advantages of the present invention will become more apparent from the following detailed description when read in conjunction with the accompanying drawings, in which:

FIG. 1A is a block diagram of a conventional data communication system;

FIG. 1B is a block diagram of a conventional data circuit-terminating equipment shown in FIG. 1A;

FIG. 1C is a block diagram showing how the remote loopback testis carried out;

FIGS. 3A and 3B are flowcharts of a conventional procedure executed by a microprocessor shown in FIG. 1B;

FIG. 4 is a block diagram showing the principle of the present invention;

FIG. 7 is a diagram showing the operation of the first preferred embodiment of the present invention;

FIG. 8 is a diagram showing the a $2^7$ PN pattern;

FIG. 10 is a diagram showing a $2^9$ pattern;

FIG. 11 is a diagram showing the operation of the operation unit shown in FIG. 4 which is configured according to a second preferred embodiment of the present invention;

FIG. 13 is a diagram showing a $2^{11}$ PN pattern;

FIG. 14 is a diagram showing the operation of the operation unit shown in FIG. 4 which is configured according to a third preferred embodiment of the present invention.

DESCRIPTION OF THE PREFERRED EMBODIMENTS

Figure 2:
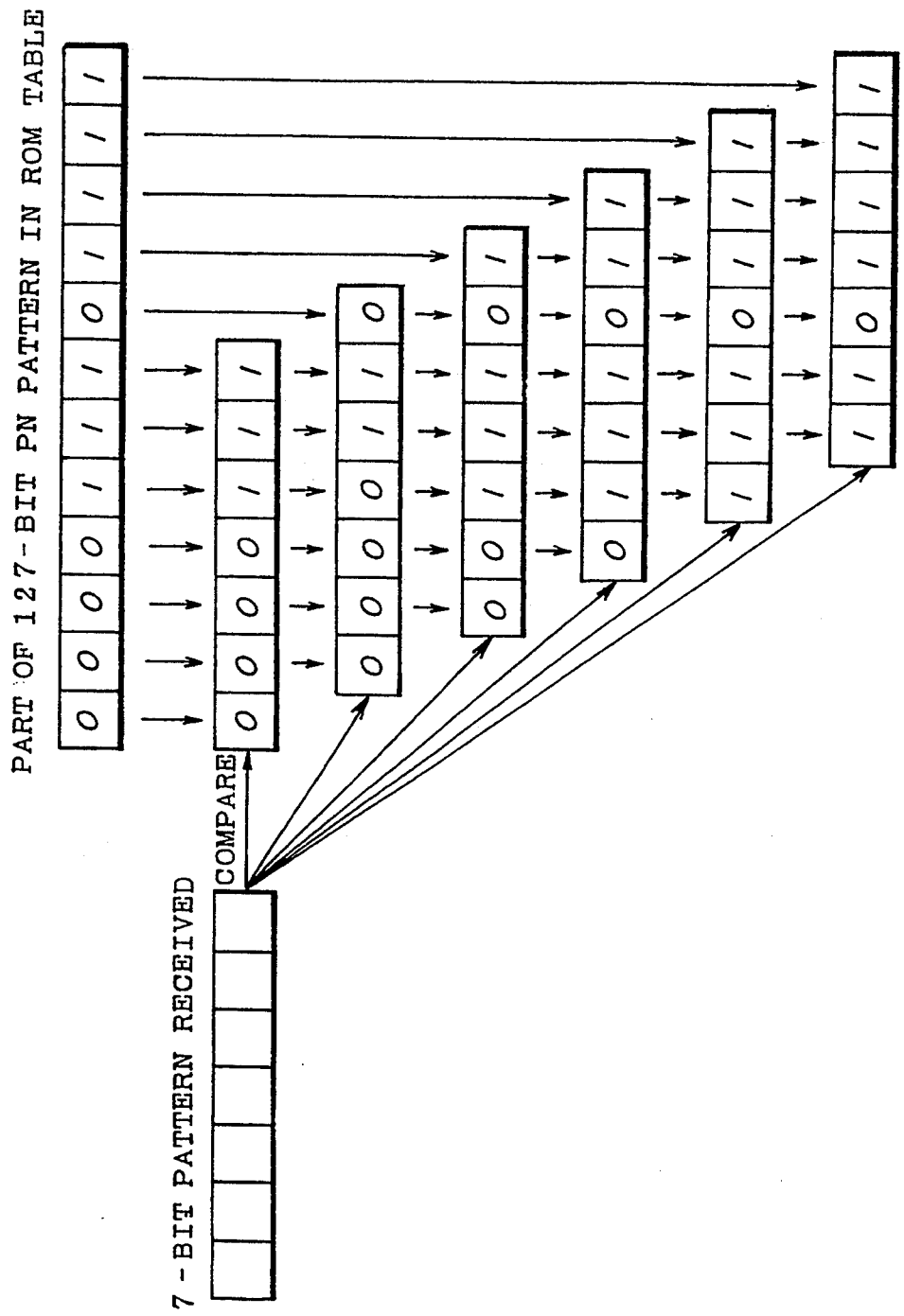
FIG. 2 is a diagram showing a conventional activating signal detection procedure.
Figure 3A:
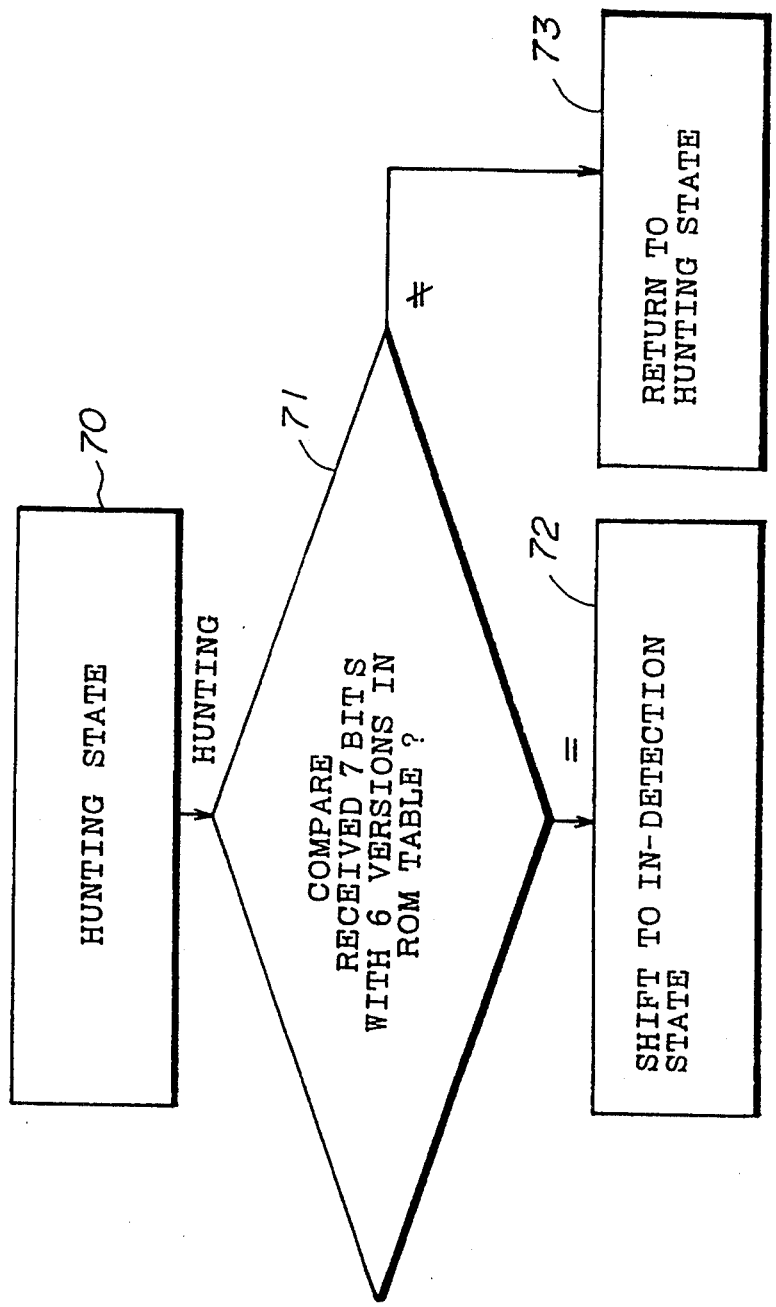

FIG. 4 shows the principle of an apparatus for detecting a PN pattern. The apparatus shown in FIG. 4 is composed of a received data latch unit 10, an operation unit 11, a comparator 12, a counter 13 and a coincidence detection unit 14 and a delay unit 15. The received data latch unit 10 latches n received bits where n is an arbitrary number. The delay unit 15 delays the latched n-bit data in order to synchronize n bits output by the latch unit 10 with n bits output by the operation unit 11. The operation unit 11 generates an n-bit pattern subsequent to the previous n-bit data by an operation which will be described later.

The operation unit 11 is configured based on the principle in which an n-bit pattern subsequent to an n-bit pattern within the period of a PN pattern is definitely determined by the generating polynomial thereof. The operation unit 11 receives an n-bit pattern input via the received data latch unit 10 and the delay unit 15, and generates, from the received n-bit pattern, an n-bit pattern subsequent thereto. More specifically, the operation unit 11 leftwardly shifts the received n-bit pattern by a predetermined number of bits. Next, the operation unit 11 executes a first exclusive-OR operation on the received n--bit pattern and the shifted n-bit pattern. Then, the operation unit 11 rightwardly shifts a resultant n-bit pattern obtained by the first exclusive-OR operation by a predetermined number of bits. Finally, the operation unit 11 executes a second exclusive-OR operation on the resultant n-bit pattern and the leftwardly shifted n-bit pattern. A resultant n-bit pattern generated by the second exclusive operation shows the n-bit pattern which should be received immediately after the n-bit pattern latched in the latch unit 10.

The comparator 12 compares the n-bit pattern latched in the received data latch unit 10 with the next n-bit pattern generated by the operation unit 11. When both the n-bit patterns are the same as each other, the comparator 12 generates an increment signal which increments the counter value in the counter 13 by +1. On the other hand, when both the n-bit patterns are not the same as each other, the comparator 12 generates a reset signal which clears the counter value in the counter 13. The counter value in the counter unit 13 is output to the coincidence detection unit 14, which receives a specified threshold value. When the counter value is equal to the specified threshold value, the coincidence detection unit 14 generates a pattern detection signal, which functions as an activating signal and activates the data circuit-terminating equipment.

Figure 5:
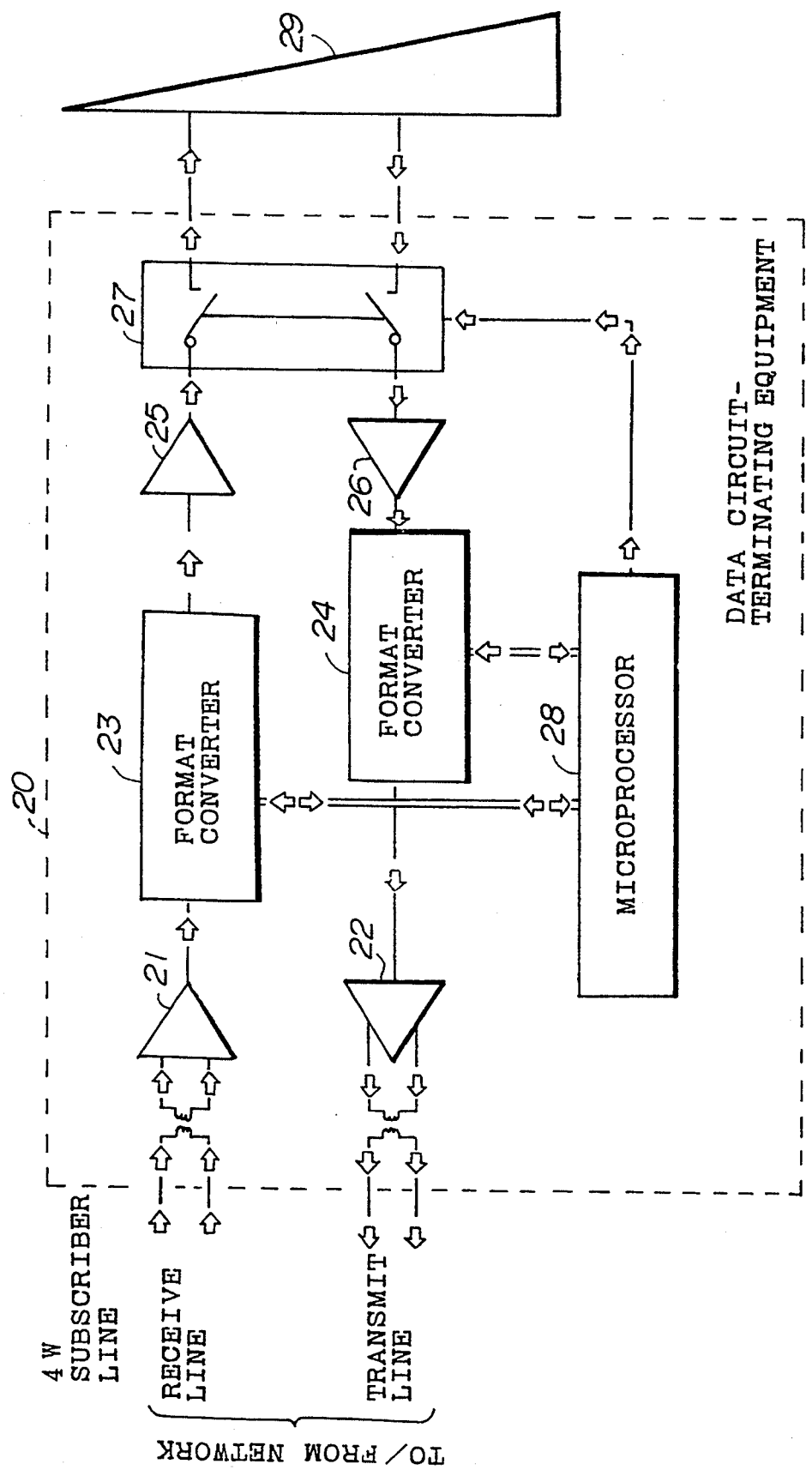
FIG. 5 is a block diagram of data circuit-terminating equipment having a PN pattern detecting procedure of a first preferred embodiment of the present invention in which a $2^7$ PN pattern is used.

FIG. 5 shows a data circuit-terminating circuit 20 configured based on the present invention. The data circuit-terminating equipment 20 is coupled, via a four-wire (4 W) subscriber line (data transmission line), to a network including a data exchange. The data circuit-terminating equipment 20 is composed of a subscriber line bipolar signal receiver 21, a subscriber line bipolar signal transmitter 22, subscriber line/data terminal format conversion units 23 and 24, a data terminal signal transmitter 25, a data terminal signal receiver 26, a loopback circuit 27 and a microprocessor 28.

The receiver 21 receives a signal transmitted via a two-wire receive line of the four--wire subscriber line and a transformer. The transmitter 22 sends a signal received from the format conversion unit 24 to a two-wire transmit line of the four-wire subscriber line via a transformer. The format conversion unit 23 converts the format of the received signal in conformity to the four-wire transmission line into a format used in a data terminal 29. The format conversion unit 24 converts the format used in the data terminal 29 into the format in conformity to the four-wire subscriber line. The transmitter 25 transmits the received signal from the format converter 23 to the data terminal 29 through the loopback circuit 27. The receiver 26 receives a signal from the data terminal 29 through the loopback circuit 27, and outputs the received signal to the format conversion unit 24. The loopback circuit 27 forms a loopback path which connects the transmitter 25 and the receiver 26 by detecting a loopback test starting signal sent out by another data circuit-terminating equipment (not shown in FIG. 5). The microprocessor 28 controls the entire operation of the data circuit-terminating equipment 20, as will be described below. It will be noted that the configuration shown in FIG. 4 is implemented by the microprocessor 28.

Figure 6:
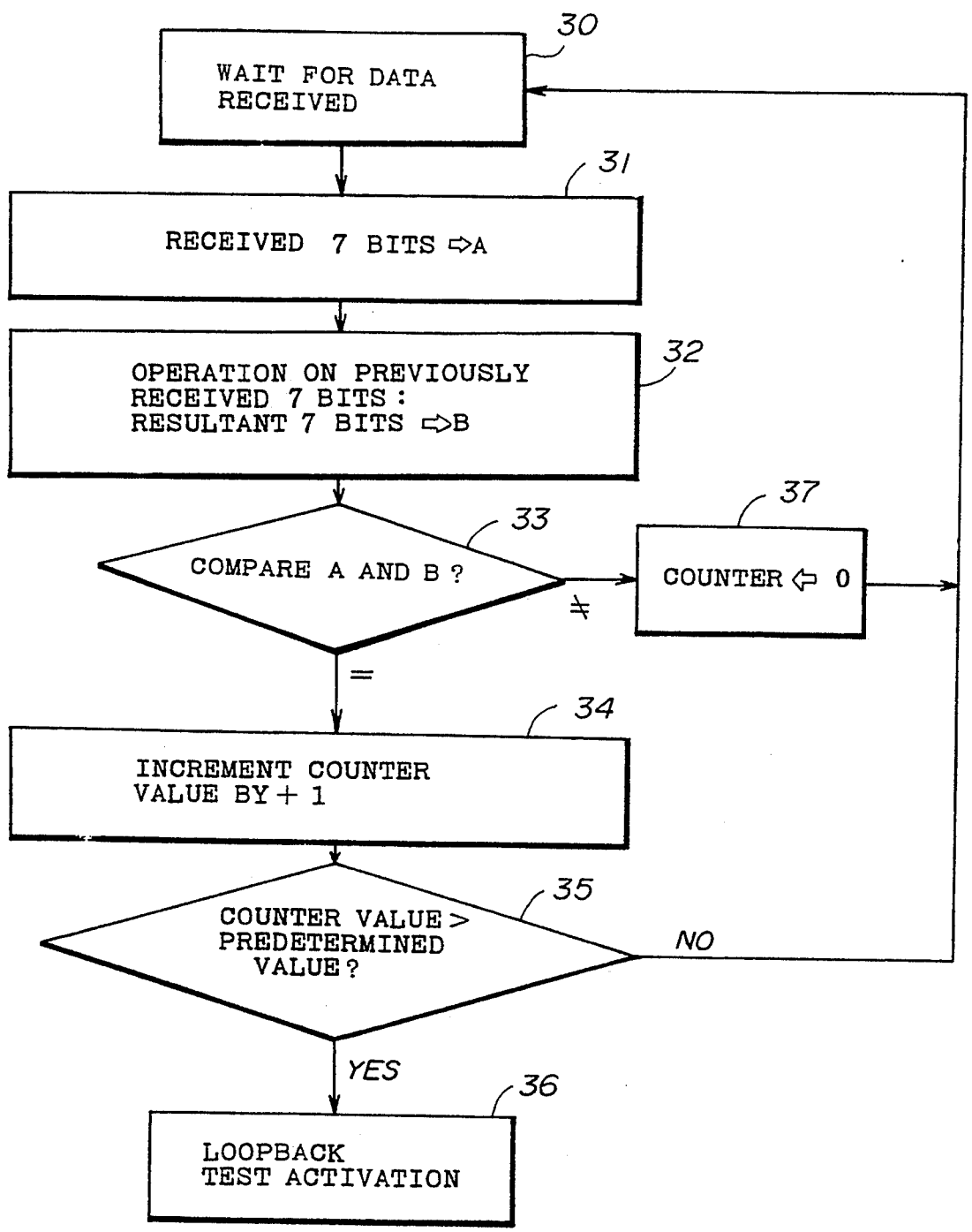
FIG. 6 is a flowchart showing the operation of the first preferred embodiment of the present invention.

FIG. 6 is a flowchart of a loopback test starting signal detection procedure executed under the control of the microprocessor 28. The illustrated procedure handles a PN pattern which consists of 127 bits within one period and which is generated by the aforementioned generating polynomial $1+X^{-4}+X^{-7}$. Further, the aforementioned n is equal to 7.

At step 30, the microprocessor 28 of the data circuit-terminating equipment 20 shown in FIG. 5 waits for data received via the two-wire receive line of the four-wire subscriber line. At step 31, the microprocessor 28 receives seven consecutive bits and registers them in an internal register A, which corresponds to the received data latch unit 10 shown in FIG. 4. At step 32, the microprocessor 28 generates a 7-bit pattern subsequent to the 7-bit pattern previously received at step 31 from the previously received 7-bit pattern, and registers the generated n-bit pattern into an internal register B. At step 33, the microprocessor 28 compares the received n-bit pattern registered in the internal register A with the generated n-bit pattern registered in the internal register B. When it is determined, at step 33, that both the n-bit patterns are the same as each other, the microprocessor 28 increments the counter value in an internal counter by +1. This internal counter corresponds to the counter 13 shown in FIG. 4 and is formed in an internal memory area of the microprocessor 28. At subsequent step 35, the microprocessor 28 determines whether or not the counter value is greater than a predetermined value (which corresponds to the aforementioned specified threshold value). When the result at step 35 is YES, the microprocessor 28 activates the loopback test (in other words, the microprocessor 28 detects the loopback test starting signal). On the other hand, when the result at step 35 is NO, the process returns to step 30. The process also returns to step 30 when it is determined, at step 33, that the received n-bit pattern is not the same as the generated n-bit pattern.

At step 34, it is possible to arbitrarily determine the predetermined value. In order to detect 16 periods (2047 bits) of the 127-bit PN pattern, the predetermined value is set equal to 292 ($\approx 2047/7$).

A description will now be given of an example of the operation executed at step 33 shown in FIG. 6 with reference to FIG. 7. A part of the 127-bit PN pattern which functions as the loopback test starting signal is illustrated in (A) of FIG. 7. As shown in FIG. 8 in which X:Y, such as 1:1, means the bit identified by a serial number X is Y, the pattern consisting of the first bit through the seventh bit is 1111111 and is the same as the pattern consisting of the 128th bit through 134th bit. Similarly, the pattern consisting of the eighth bit through the 14th bit is 0000111 and is the same as the pattern consisting of the 135th bit through the 140th bit. That is, the same seven-bit pattern repeatedly appears for every 127 bits ($=2^7-1$) in the PN pattern obtained by the generating polynomial $1+X^{-4}+X^{-7}$. Thus, it is possible to generate the next seven-bit pattern from the previously received seven-bit pattern prior to the above next seven-bit pattern.

Returning FIG. 7, it is now assumed that the received seven bit pattern is 0000111 (which correspond to the eighth through 14th bits), as shown in (B) thereof. At step 1 shown in (C) of FIG. 7, the microprocessor 28 receives the received seven bits labeled (a). At step 2, the microprocessor 28 leftwardly shifts the received seven-bit pattern (a) by three bits and sets the three bits on the right side to zero, so that a shifted seven-bit pattern (b) is obtained. At step 3, the microprocessor 28 executes the exclusive-OR operation on the patterns (a) and (b), so that a resultant seven-bit pattern (c) is obtained. At step 4, the microprocessor 28 rightwardly shifts the pattern (c) by four bits and sets the four bits on the left side to zero, so that a shifted seven-bit pattern (d) is obtained. At step 5, the microprocessor 28 executes the exclusive-OR operation on the patterns (c) and (d), so that a resultant seven-bit pattern (e) is generated. It will be noted that the seven-bit pattern (e) shows a seven-bit pattern which should be received immediately after the received seven-bit pattern shown in (B) of FIG. 7.

Figure 9:
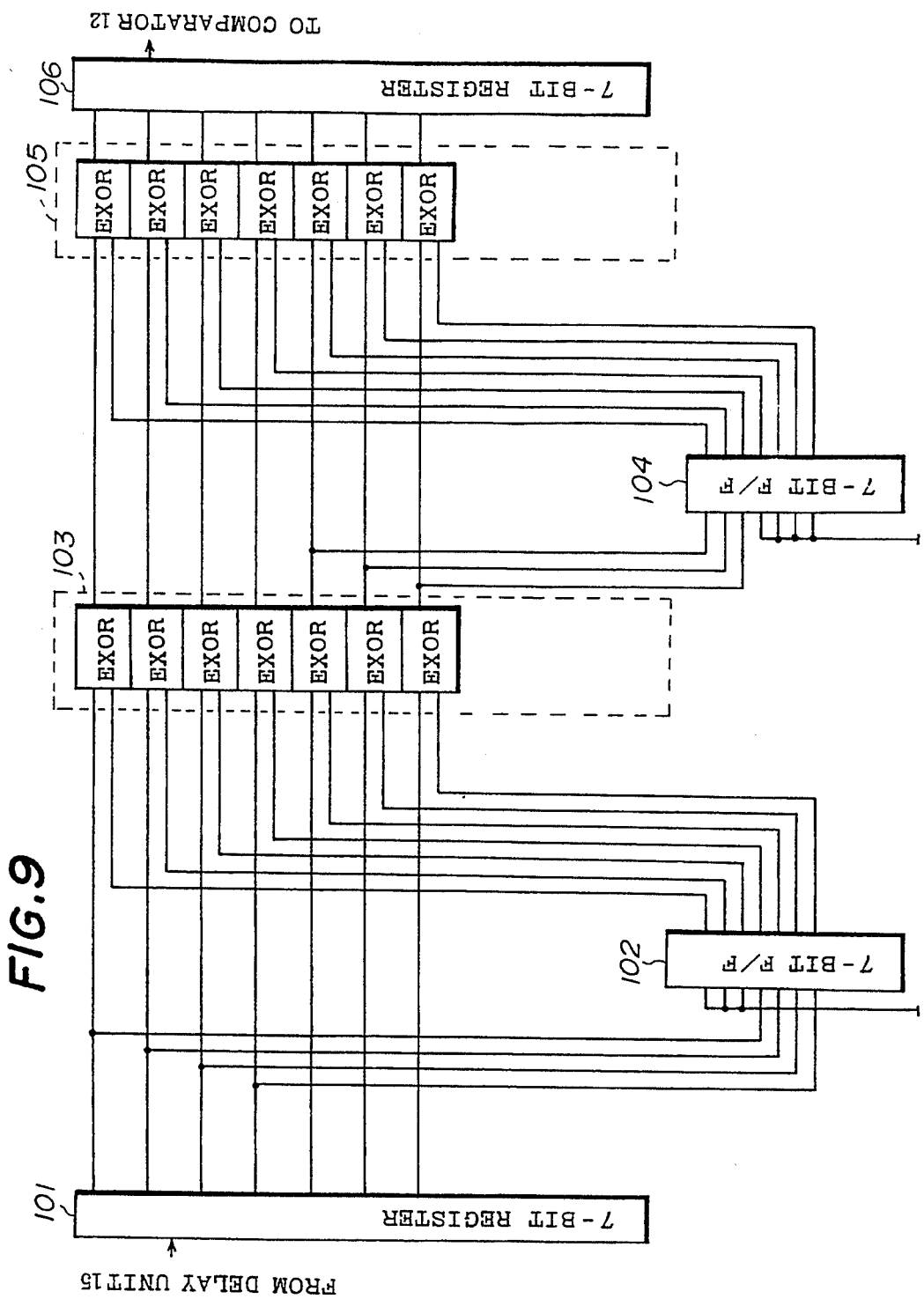
FIG. 9 a block diagram of an operation unit shown in FIG. 4.

The above-mentioned procedure shown in FIG. 7 can be realized by software. Alternatively, it is possible to implement the procedure shown in FIG. 7 by a hardware configuration shown in FIG. 9. The configuration shown in FIG. 9 corresponds to the operation unit 11 (FIG. 4), and is made up of two 7-bit registers 101 and 106, two seven-bit flip-flops (F/F) 102 and 104, and two exclusive-OR units (hereafter simply referred to as EXOR units) 103 and 105. The seven consecutive bits received are latched in the register 101 and are output to the EXOR unit 103. The four low-order bits out of the seven bits are output to the flip-flop 102. The flip-flop 102 functions to leftwardly shift the seven bits by three bits and outputs a three-bit shifted pattern to the EXOR unit 103. The EXOR unit 103 has seven EXOR gates, which execute the respective exclusive-OR operations on the corresponding bits of the seven-bit patterns from the register 101 and the flip-flop 102. Then, seven bits output by the EXOR unit 103 are output to the EXOR unit 105, and the three high-order bits thereof are output to the flip-flop 104. The flip-flop 104 functions to rightwardly shift the seven bits generated by the EXOR unit 103 by four bits. Seven bits generated by the flip-flop 104 are output to the EXOR unit 105, which includes seven EXOR gates. Seven bits obtained by the exclusive-OR operation in the EXOR unit 105 are latched in the register 106, and are then output to the comparator 12 shown in FIG. 4. It will be noted that the seven-bit pattern latched in the register 106 shows the 7-bit pattern which should be received after the seven-bit pattern latched in the register 101.

The present invention is not limited to the 127-bit PN pattern. A description will now be given of a second embodiment of the present invention which handles a $2^9$ PN pattern (511-bit PN pattern) generated by a generating polynomial $1+X^{-5}+X^{-9}$.

FIG. 10 shows bits generated by the generating polynomial $1+X^{-5}+X^{-9}$. As shown, the first through ninth bits are 111111111, and the 10th through 18th bits are 000001111. The 512th through 520th bits are 111111111, and the 521th through 529th bits are 000001111. That is, the same nine-bit patterns occurs for every 511 bits.

Referring to FIG. 11, it is now assumed that the received 9-bit pattern consists of the 186th through 194th bits equal to 101110010 as shown in (B) thereof. At step 1 shown in (C) of FIG. 11, the operation unit 11 shown in FIG. 4 receives the nine bits 101110010, labeled (a). At step 2, the operation unit 11 leftwardly shifts the received nine bits by four bits, so that nine bits 100100000 labeled (b) is obtained. At step 3, the operation unit 11 executes the exclusive-OR operation on the received nine bits (a) and the shifted nine bits (b), and generates a resultant nine-bit pattern 001010010, labeled (c). At step 4, the operation unit rightwardly shifts the nine-bit pattern (c) by five bits, so that shifted nine bits 000000010 labeled (d) are obtained. At step 5, the operation unit 11 executes the exclusive-OR operation on the nine-bit patterns (c) and (d), so that a nine-bit pattern 001010000 labeled (e) is obtained. As shown in (A) of FIG. 11, the pattern (e) shows a nine-bit pattern which should be received after the received nine-bit pattern shown in (B) thereof.

Figure 12:
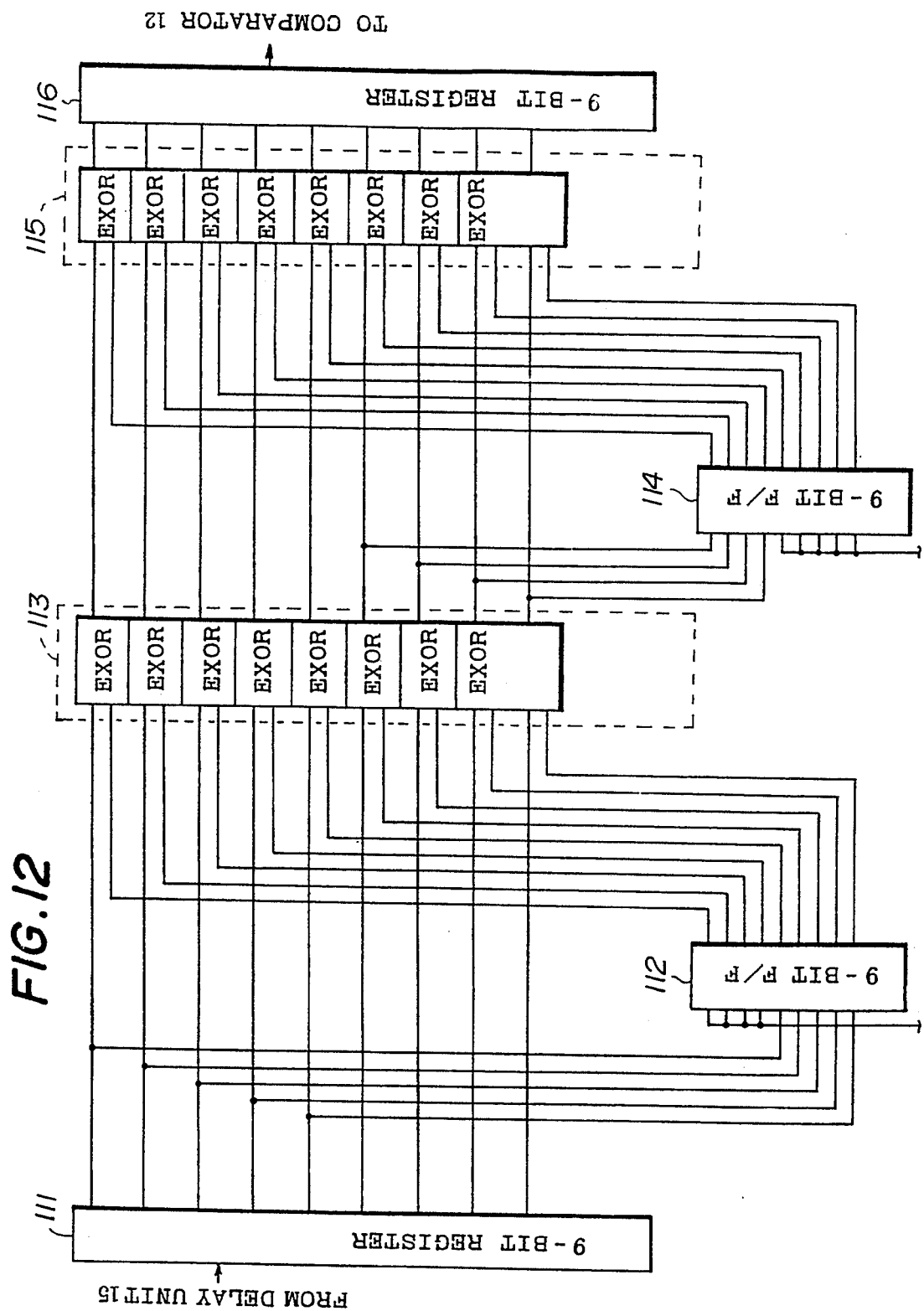
FIG. 12 is a block diagram of a hardware configuration of the second preferred embodiment of the present invention.

The procedure shown in FIG. 11 can be realized by a hardware configuration shown in FIG. 12. The configuration shown in FIG. 12 is composed of two nine-bit registers 111 and 116, two nine-bit flip-flops 112 and 114, and two EXOR units 113 and 115, each having nine EXOR gates. The operation of the shift register 111 corresponds to step 1 shown in (C) of FIG. 11, and the operation of the flip-flop 112 corresponds to step 2 shown therein. The operation of the EXOR unit 113 corresponds to step 3, and the operation of the flip-flop 114 corresponds to step 4. Further, the operation of the EXOR unit 115 corresponds to step 5.

A description will now be given of a third preferred embodiment of the present invention which handles a $2^{11}$ PN pattern (2047-bit PN pattern) generated by a generating polynomial $1+X^{-9}+X^{-11}$.

FIG. 13 shows bits generated by the generating polynomial $1+X^{-9}+X^{-11}$. As shown, the first through eleventh bits are 11111111111, and the 12th through 22th bits are 00000000011. The 2048th through 2058th bits are 11111111111, and the 2059th through 2069th bits are 00000000011. That is, the same 11-bit patterns occur for every 2047 ($=2^{11}-1$) bits.

Referring to FIG. 14, it is now assumed that the received 11-bit pattern consists of the 565th through 575th bits equal to 11011011001 as shown in (B) thereof. At step 1 shown in (C) of FIG. 14, the operation unit 11 shown in FIG. 4 receives the 11 bits 11011011001, labeled (a). At step 2, the operation unit 11 leftwardly shifts the received 11 bits by two bits, so that 11 bits 01101100100 labeled (b) is obtained. At step 3, the operation unit 11 executes the exclusive-OR operation on the received nine bits (a) and the shifted 11 bits (b), and generates a resultant 11-bit pattern 10110111101, labeled (c). At step 4, the operation unit rightwardly shifts the 11-bit pattern (c) by nine bits, so that shifted nine bits 00000000010 labeled (d) is obtained. At step 5, the operation unit 11 executes the exclusive-OR operation on the 11-bit patterns (c) and (d), so that an 11-bit pattern 10110111111 labeled (e) is obtained. As shown in (A) of FIG. 14, the pattern (e) shows an 11-bit pattern which should be received after the received 11-bit pattern shown in (B) thereof.

Figure 15:
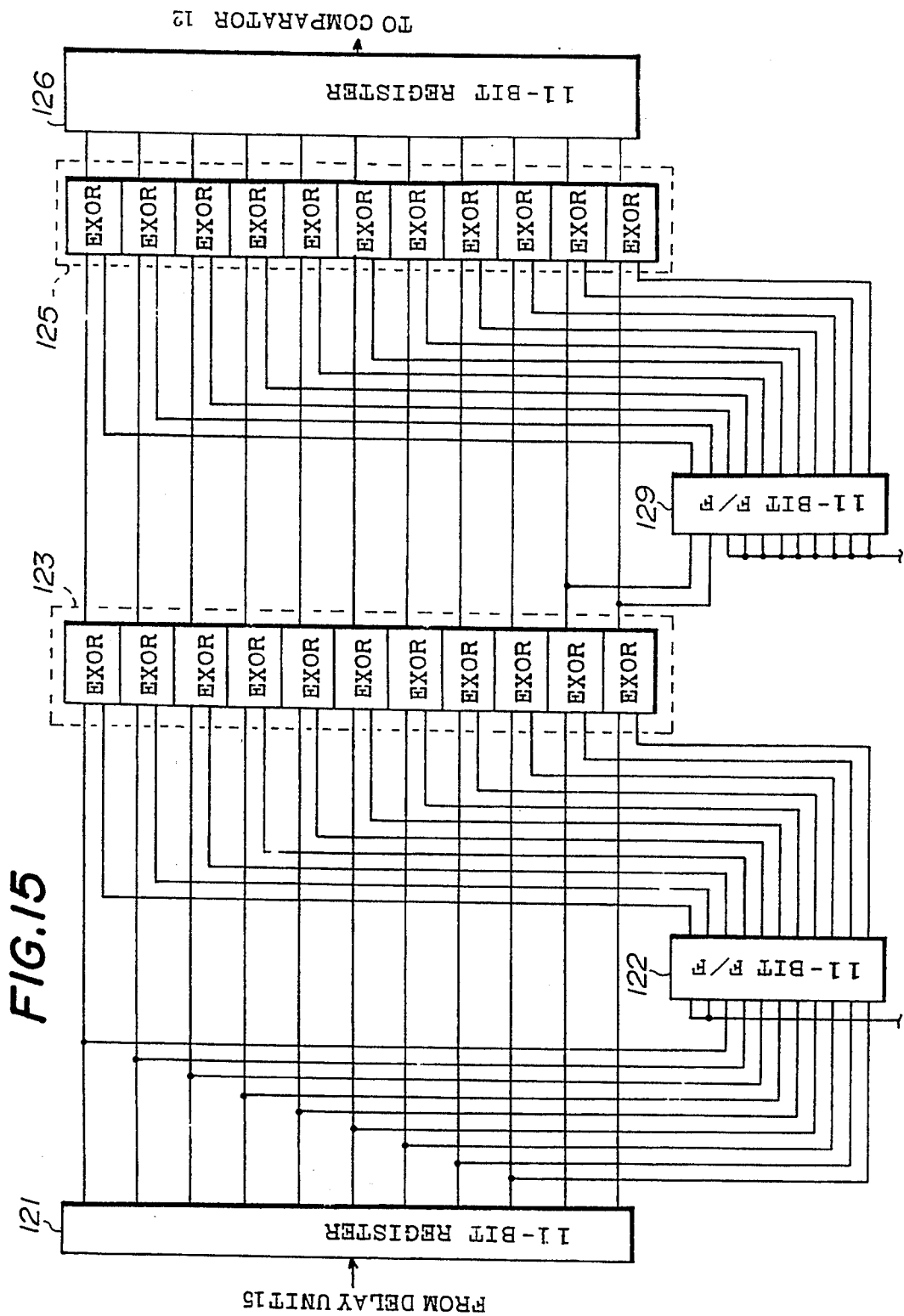
FIG. 15 is a block diagram of a hardware configuration of the third preferred embodiment of the present invention.

The procedure shown in FIG. 14 can be realized by a hardware configuration shown in FIG. 15. The configuration shown in FIG. 12 is composed of two 11-bit registers 121 and 126, two 11-bit flip-flops 122 and 124, and two EXOR units 123 and 125, each having 11 EXOR gates. The operation of the shift register 121 corresponds to step 1 shown in (C) of FIG. 14, and the operation of the flip-flop 122 corresponds to step 2 shown therein. The operation of the EXOR unit 123 corresponds to step 3, and the operation of the flip-flop 124 corresponds to step 4. Further, the operation of the EXOR unit 125 corresponds to step 5.

The above-mentioned procedures are mainly related to the detection of the loopback test starting (activating) signal. Of course, it is possible to use the above-mentioned procedures in order to detect the aforementioned confirmation signal and the complete signal. Further, it is possible to use the present invention to other applications.

The description is not limited to the specifically disclosed embodiments, and variations and modifications may be made without departing from the scope of the present invention.

What is claimed is:

1. A method for detecting a PN (Pseudo Noise) pattern for a remote loopback test in a communication system, said method comprising the steps of:

(a) receiving a first n-bit pattern (n is an arbitrary number) which is a part of said PN pattern;

(b) leftwardly shifting said first n-bit pattern by a first predetermined number of bits, so that a second n-bit pattern is generated;

(c) executing an exclusive-OR operation on said first n-bit pattern and said second n-bit pattern, so that a third n-bit pattern is generated;

(d) rightwardly shifting said third n-bit pattern by a second predetermined number of bits, so that a fourth n-bit pattern is generated;

(e) executing an exclusive-OR operation on said third n-bit pattern and said fourth n-bit pattern, so that a fifth n-bit pattern is generated, wherein said fifth n-bit pattern shows a sixth n-bit pattern which should be received after said first n-bit pattern, and said step (b) through (e) are repeatedly carried out each time n bits of said first n-bit pattern are received at step (a);

(f) determining whether or not said fifth n-bit pattern is identical to said sixth n-bit pattern; and (g) generating a pattern detection signal when said fifth n-bit pattern is identical to said sixth n-bit pattern for a predetermined number of times to activate by said pattern detection signal a predetermined loopback test procedure in the communication system.

2. A method as claimed in claim 1, further comprising the steps of:

(h) counting a number of times that said step (f) determines that said fifth n-bit pattern is identical to said sixth n-bit pattern; and (i) determining the number of times counted at step (h) becomes equal to a predetermined number of times that said step (f) determines that said fifth n-bit pattern is identical to said sixth n-bit pattern, said predetermined procedure in the communication system being activated when said step (i) determines the number of times counted at step (h) becomes equal to the predetermined number of times.

3. A method as claimed in claim 1, wherein:
said PN pattern is a PN pattern generated by a generating polynomial $1+X^{-4}+X^{-7}$;
said first predetermined number of bits is 3; and
said second predetermined number of bits is 4.

4. A method as claimed in claim 1, wherein:
said PN pattern is a PN pattern generated by a generating polynomial $1+X^{-5}+X^{-9}$;
said first predetermined number of bits is 4; and
said second predetermined number of bits is 5.

5. A method as claimed in claim 1, wherein:
said PN pattern is a PN pattern generated by a generating polynomial $1+X^{-9}+X^{-11}$;
said first predetermined number of bits is 2; and
said second predetermined number of bits is 9.

6. A method for detecting a PN (Pseudo Noise) pattern for a remote loopback test in a communication system, said method comprising the steps of:

(a) receiving a first n-bit pattern (n is an arbitrary number) which i a part of said PN pattern;

(b) generating a second n-bit pattern subsequent to said first n-bit pattern from said first n-bit pattern by a predetermined shift and exclusive-OR operation, wherein said second n-bit pattern shows a resultant n-bit pattern which should be received after said first n-bit pattern, and said step (b) is repeatedly carried out each time n bits of said first n-bit pattern are received at step (a);

(c) determining whether or not said resultant n-bit pattern is identical to said second n-bit pattern; and (d) generating a pattern detection signal when said resultant signal is identical to said second n-bit pattern for a predetermined number of times to activate by said pattern detection signal a predetermined loopback test procedure in the communication system.

7. An apparatus for detecting a PN (Pseudo Noise) pattern for a remote loopback test in a communication system, said apparatus comprising:

first means for receiving a fist n-bit pattern (n is an arbitrary number) which is a part of said PN pattern;

second means for leftwardly shifting said first n-bit pattern by a first predetermined number of bits, so that a second n-bit pattern is generated;

third means for executing an exclusive-OR operation on said first n-bit pattern and said second n-bit pattern, so that a third n-bit pattern is generated;

fourth means for rightwardly shifting said third n-bit pattern by a second predetermined number of bits, so that a fourth n-bit pattern is generated;

fifth means for executing an exclusive-OR operation on said third n-bit pattern and said fourth n-bit pattern, so that a fifth n-bit pattern is generated, wherein said fifth n-bit pattern shows a sixth n-bit pattern which should be received after said first n-bit pattern, and said second through fifth means carry out respective operations each time n bits of said first n-bit pattern are received by said first means;

sixth means for determining whether or not said fifth n-bit pattern is identical to said sixth n-bit pattern; and seventh means for generating a pattern detection signal when said fifth n-bit pattern is identical to said sixth n-bit pattern for a predetermined number of times to activate by said pattern detection signal a predetermined loopback test procedure in the communication system.

8. An apparatus as claimed in claim 7, further comprising:

eighth means for counting a number of times that said sixth means determines that said fifth n-bit pattern is identical to said sixth n-bit pattern; and ninth means for determining the number of times counted by said eighth means becomes equal to a predetermined number of times that said sixth means determines that said fifth n-bit pattern is identical to said sixth n-bit pattern, said predetermined procedure in the communication system being activated when said ninth means determines the number of times counted by said eighth means becomes equal to the predetermined number of times.

9. An apparatus as claimed in claim 7, wherein:
said PN pattern is a PN pattern generated by a generating polynomial $1+X^{-4}+X^{-7}$;
said first predetermined number of bits is 3; and
said second predetermined number of bits is 4.

10. An apparatus as claimed in claim 7, wherein:
said PN pattern is a PN pattern generated by a generating polynomial $1+X^{-5}+X^{-9}$;
said first predetermined number of bits is 4; and
said second predetermined number of bits is 5.

11. An apparatus as claimed in claim 7, wherein:
said PN pattern is a PN pattern generated by a generating polynomial $1+X^{-9}+X^{-11}$;
said first predetermined number of bits is 2; and
said second predetermined number of bits is 9.

12. An apparatus for detecting a PN (Pseudo Noise) pattern for a remote loopback test in a communication system, said apparatus comprising:

first means for receiving a fist n-bit pattern (n is an arbitrary number) which is a part of said PN pattern; and (b) second means for generating a second n-bit pattern subsequent to said first n-bit pattern from said first n-bit pattern by a predetermined shift and exclusive-OR operation, wherein said second n-bit pattern shows a resultant n-bit pattern which should be received after said first n-bit pattern, and said second means repeatedly carries out its operation each time n bits of said first n-bit pattern are received by said first means;

(c) third means for determining whether or not said resultant n-bit pattern is identical to said second n-bit pattern; and (d) fourth means for generating a pattern detection signal when said resultant signal is identical to said second n-bit pattern for a predetermined number of times to activate by said pattern detection signal a predetermined loopback test procedure in the communication system.

* * * * *